W. Cameron,

Tobacco Press,

No. 1,128, Reissued Jan 15, 1861.

Witnesses;
E. Cohen
Julius Hirsh

Inventor;
William Cameron
By atty
A B Stoughton

AM. PHOTO-LITHO. CO. N.Y. (OSBORNE'S PROCESS)

UNITED STATES PATENT OFFICE.

WILLIAM CAMERON, OF PETERSBURG, VIRGINIA.

IMPROVEMENT IN TOBACCO-PRESSES.

Specification forming part of Letters Patent No. 22,014, dated November 9, 1858; Reissue No. 1,128, dated January 15, 1861.

DIVISION B.

*To all whom it may concern:*

Be it known that I, WILLIAM CAMERON, of Petersburg, in the county of Dinwiddie and State of Virginia, have invented certain new and useful Improvements in Machinery for Pressing Tobacco; and I do hereby declare the following to be a full, clear, and exact description of the construction and operation of the same; reference being had to the accompanying drawings, making a part of this specification, in which—

Figure 1:
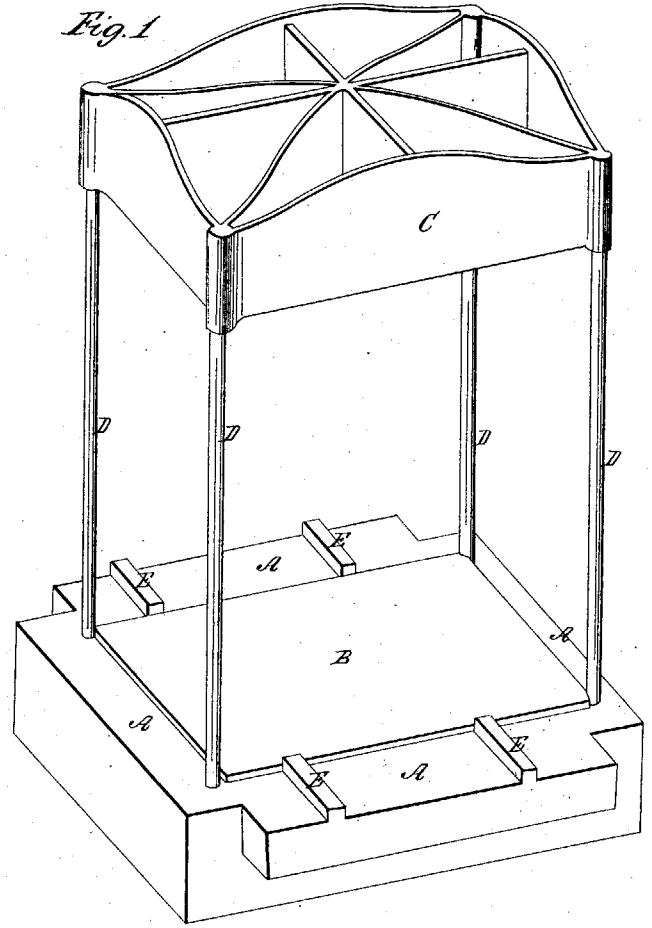
Figure 2:
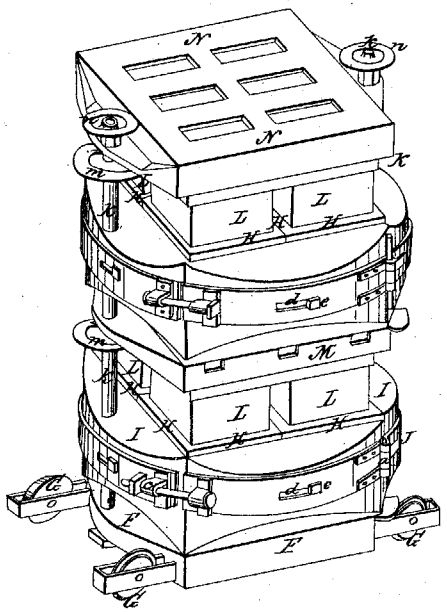

Figure 1 represents a perspective view of a hydraulic press used for the purpose; and Fig. 2 represents in perspective the retaining press or stand, composed of a pile of boxes, plates, compressing boards or blocks, and their several connecting parts, and forming a portable secondary press, to be used in connection with the hydraulic press in the pressing of the tobacco.

The pressing of tobacco into a suitable mercantile or commercial condition, so that it will stand moisture or dryness for a long period and not become damaged by either, which, if not properly put up, it would be, has heretofore been a tedious and expensive operation, owing to the amount of room, the number of laborers, and the quantity of machinery that are required. My object is, by a simple, compact, and powerful hydraulic press, in connection with a cheap retaining-press, to render this heretofore expensive operation comparatively a cheap one, and put the tobacco into a better condition to withstand any climate than heretofore done; and my invention consists in combining, with a retaining press or stand that is to be used in connection with a hydraulic press a series of boxes, so as to use the great power of the hydraulic press to pack or compress the tobacco into the boxes in which it is to remain or be sent to market.

To enable others skilled in the art to make and use my invention, I will proceed to describe the same with reference to the drawings.

In Fig. 1 is represented the outline of a hydraulic press of compact form and easily accessible, so as to run onto or off from it the retaining-press. A is the base of the press, B the follower, and C the top plate, said base and top plates being firmly connected to each other by posts, rods, or columns D. On the base A are arranged ways E, for guiding a truck or set of wheels arranged on the secondary press, to be hereinafter described, so that it may be run to, on, or from the hydraulic press. The hydraulic chamber is underneath the follower or moving part of the press.

Of the secondary or retaining press, F represents a base-plate or bed furnished with truck-wheels G, that run upon the ways E of the primary or hydraulic press. On this base-plate F is arranged the first tier of tobacco-boxes, H, (of which there may be any suitable number, and limited only by the capacity of the hydraulic press,) and around these boxes are placed the segments I, which are to hold them against the strain of the press in an outward direction. These segments are made as follows: The portions I may be of wood, and they are united to a metallic band or hoop, J, that will surround or inclose them and hold them firmly together. These portions I are spandrel-shaped, filling in between the square sides of the boxes and the circle of the hoop or band, and one of the pieces I, with its portion of the band or hoop, should be hinged to the other portions, as at *a*, to facilitate their being placed around or removed from the boxes, and the screw or retaining rods K should pass through two of these segments or pieces I—viz., the two that are on opposite sides of the press or stand, or diametrically opposite to each other. When the segments are placed around the boxes, the two ends of the hoop or band J are brought together, and by means of a screw-rod, *b*, that passes through lugs or ears *c* on said ends, it is tightly drawn up and secured. It is obvious that in drawing up the band or hoop the portions or segments I cannot slip, owing to the friction against the boxes H, it being a "wood and wood" contact, and because, also, of the rods K passing through two of them; but the hoop must slip as it is drawn up, and the segments should be connected to the hoop. To admit of the hoop coming up tight under such an arrangement of parts, and without moving the segments, except toward a common center, and not circumferentially, a slot, *d*, is cut in the hoop at each end of its connection with the segments I, and a union between them is made by headed pins or bolts *e*, which allow the hoops to move independently of the segments, although they are connected together.

When so much of the press is arranged and provided as described, the boxes H are filled with the plugs or sheets of tobacco that are to be compressed within them, the first tier or series being placed on the bed-piece F. The blocks L are then placed one in or over the top of each box, so as to rest on the tobacco, and over the blocks may be placed other pieces, *f*, if found necessary, for leveling up the tier or section, or to form an even or square top, upon which a metal plate, M, is placed, two sides of which are furnished with holes or openings for the screw-rods K to pass through. Upon this plate M is built up another tier of boxes and blocks L, which are arranged, secured, and otherwise furnished, as in the first-named tier, and over them another metallic plate, N, is placed, and so on, if more than two tiers of boxes are to be built up, as above described of the lower tier, and the pressing operation may be proceeded with as follows: The screw wheels or nuts *m* are first run down on the rods K, which are furnished with screw-threads at proper intervals, or throughout their length, so that these nuts may be out of the way. The screw wheels or nuts *n* are now run down on the screw-rods K, which draws the top plate, N, down toward the base or bed F, the lower ends of the screw-rods having heads upon them which come against the under side of the bed F, and the blocks L are thus brought down against the tobacco, and to the other extent of the power of the hand screws or nuts, pressing the tobacco down into the boxes and holding that pressure upon it. A hand wheel or nut may be so arranged as to press each separate tier as it is built up, and thus any tier may be removed without beginning at the top, as the under nuts, *m*, which would act as jam-nuts in one sense and as raising-nuts in another sense, may be used to hold or to raise up the plate against which it presses or can be made to press. This stand or secondary press is then run onto the hydraulic press and the latter is set in motion, which raises up the follower B, and with it the secondary press, until the top plate, N, comes against the plate C. The pressure that was upon the secondary or retaining press is then transferred to the hydraulic or primary press and is continued and added to until sufficient pressure is upon the tobacco to pack it into a solid mass, driving out all the air. The nuts or hand-wheels *n* on the screw-rods are now run down against the plates that overlie each tier of boxes and blocks, and thus hold or retain the pressure put upon the tobacco by the major press, while the hydraulic may be relieved of it and prepared for another stand or second operation of similar kind. The retaining-press may now be run off out of the way and allowed to stand until the tobacco is set in its pressed condition, and the covers of the boxes may be pressed on or into the box in a similar way as the tobacco itself is and nailed while under pressure. One hydraulic press will serve any ordinary number of secondary presses, while the secondary presses will retain the pressure of the greater press upon themselves, which the hydraulic press, as above stated, could not do for any length of time, owing to the difficulty of packing it so that it will not leak under the heavy pressure. Besides the capability of opening up this retaining-press at any of its sections, it avoids the necessity of raising the top plate, N, to any appreciable height, and this plate is quite heavy.

The tobacco may have been previously pressed by the hydraulic press before it goes into the boxes where it is a second time pressed. The object is to prepare and send to market tobacco that has been pressed by a hydraulic pressure, and that pressure preserved upon it, though by other means than that which creates the pressure, tobacco so pressed keeping much better in all climates than that pressed by less force than a hydraulic power, which is the greatest known mechanical power, requiring but little labor to work it, and taking up but an exceedingly limited space in the building.

Having thus fully described the nature and object of my invention, what I claim under this patent is—

Combining with a retaining press or stand that is to be used in connection with and receive its pressure from a hydraulic press a series of boxes into which the tobacco is pressed by the greater press, but retained by a minor press, substantially as described.

WILLIAM CAMERON.

Witnesses:

ROBERT CRAWFORD,
GEORGE CAMERON.